(12) United States Patent
Siddiqui et al.

(10) Patent No.: US 12,284,176 B2
(45) Date of Patent: Apr. 22, 2025

(54) SYSTEM AND METHOD OF IMAGED BASED LOGIN TO AN ACCESS DEVICE

(71) Applicant: THALES DIS CPL USA, INC., Austin, TX (US)

(72) Inventors: Najam Siddiqui, Pflugerville, TX (US); Asad Mahboob Ali, Austin, TX (US); Benoît Famechon, Cedar Park, TX (US)

(73) Assignee: THALES DIS CPL USA, INC.

( * ) Notice: Subject to any disclaimer, the term of this patent is extended or adjusted under 35 U.S.C. 154(b) by 218 days.

(21) Appl. No.: 17/957,037

(22) Filed: Sep. 30, 2022

(65) Prior Publication Data

US 2024/0114022 A1    Apr. 4, 2024

(51) Int. Cl.
*H04L 9/40* (2022.01)

(52) U.S. Cl.
CPC ........ *H04L 63/0853* (2013.01); *H04L 63/083* (2013.01)

(58) Field of Classification Search
CPC ............... G06F 21/31; G06F 21/34–36; G06F 21/42–43; G06F 21/45; G06F 2221/2103; H04L 63/08; H04L 63/083–0846; H04L 63/0853; H04L 63/20; H04L 2463/082; H04W 12/06; H04W 12/77
See application file for complete search history.

(56) References Cited

U.S. PATENT DOCUMENTS

| | | | |
|---|---|---|---|
| 8,165,303 B1 | 4/2012 | Steele et al. | |
| 8,594,632 B1 | 11/2013 | Azizi et al. | |
| 8,667,560 B2 | 3/2014 | Albisu | |
| 9,124,571 B1 | 9/2015 | Lin et al. | |
| 9,985,786 B1 * | 5/2018 | Bhabbur | G06F 3/0488 |
| 10,158,646 B1 | 12/2018 | Desai et al. | |
| 10,263,973 B2 | 4/2019 | Karlisch et al. | |
| 10,509,893 B2 | 12/2019 | Hutchinson | |

(Continued)

FOREIGN PATENT DOCUMENTS

WO    2022159345 A1    7/2022

OTHER PUBLICATIONS

International Search Report (PCT/ISA/2010) & Written Opinion (PCT/ISA/237) mailed by ISA/EP on Dec. 22, 2023 for corresponding International Application pursuant to the PCT, N° PCT/US2023/034245 (14 pages).

*Primary Examiner* — Kevin Bechtel

(57) ABSTRACT

A system or method of image-based login authentication of a user on an access device using a mobile device registered to the user can include receiving login information at the access device, displaying an image reference at the access device, the image reference being one among a plurality of image references provisioned at the mobile device and an authentication authority, displaying the image reference selected by the authentication authority along with other image references, and receiving an authentication token at the authentication authority from the mobile device corresponding to a selection at the mobile device of one of the plurality of image references provisioned at the mobile device. The method can further include receiving validation by the access device of a completed authentication if the selection matches the image reference displayed at the access device and allowing login at the access device if the authentication token is validated.

15 Claims, 9 Drawing Sheets

(56) References Cited

U.S. PATENT DOCUMENTS

| | | |
|---|---|---|
| 11,177,963 B2 | 11/2021 | Famechon et al. |
| 11,271,922 B2 | 3/2022 | Hugot |
| 2009/0327138 A1 | 12/2009 | Mardani et al. |
| 2010/0043062 A1 | 2/2010 | Alexander et al. |
| 2010/0120396 A1 | 5/2010 | Faith et al. |
| 2011/0072493 A1 | 3/2011 | Morishita |
| 2011/0145899 A1 | 6/2011 | Cao et al. |
| 2011/0231656 A1 | 9/2011 | Di Crescenzo |
| 2013/0023241 A1 | 1/2013 | Lim |
| 2013/0039484 A1 | 2/2013 | Sun et al. |
| 2013/0068837 A1 | 3/2013 | Dollard |
| 2014/0108810 A1 | 4/2014 | Chenna |
| 2014/0214688 A1 | 7/2014 | Weiner et al. |
| 2014/0372754 A1 | 12/2014 | Aissi et al. |
| 2015/0052349 A1 | 2/2015 | Gero et al. |
| 2015/0089613 A1 | 3/2015 | Tippett et al. |
| 2015/0302571 A1 | 10/2015 | Lambert |
| 2016/0352722 A1 | 12/2016 | Johri |
| 2017/0257363 A1* | 9/2017 | Franke ................ H04W 12/069 |
| 2017/0302642 A1 | 10/2017 | Hindocha et al. |
| 2019/0182050 A1 | 6/2019 | Famechon et al. |
| 2020/0233949 A1* | 7/2020 | Xia ....................... H04W 12/08 |

\* cited by examiner

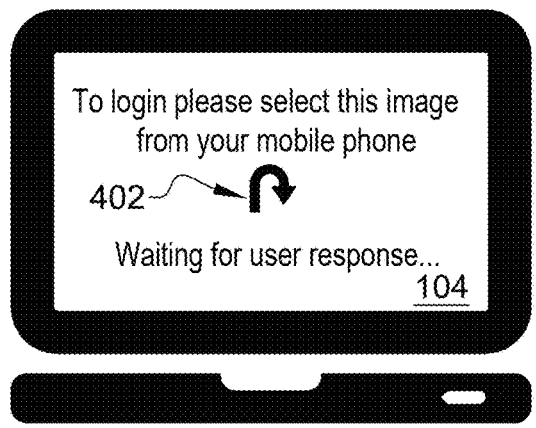
Fig. 4A : From Desktop  400
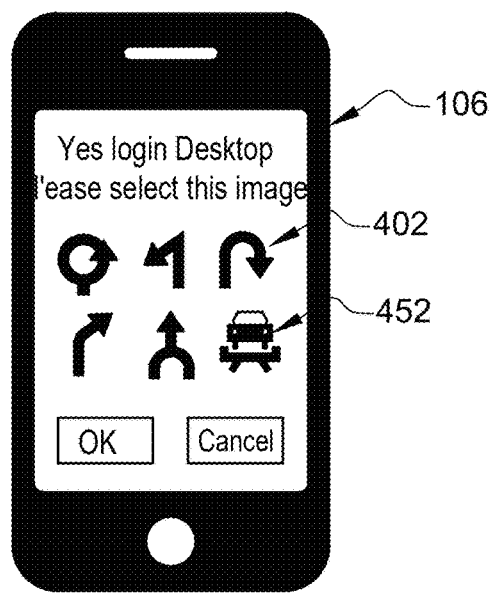
Fig. 4B : From user's mobile

SYSTEM AND METHOD OF IMAGED BASED LOGIN TO AN ACCESS DEVICE

CROSS-REFERENCE TO RELATED APPLICATIONS

Not applicable.

TECHNICAL FIELD

The present disclosure generally relates to authenticating users to an access device. More particularly, but not exclusively, the present disclosure relates to imaged based authentication of users to an access device via a user's mobile device.

BACKGROUND

It is known that a user uses a PC (web) browser to submit, through a login page, to a server, a One Time Password (or OTP) that has been previously sent, through a Short Message Service (or SMS) message, to a registered user mobile phone. The server that accesses the OTP that is previously generated at the server side verifies on-line the received OTP. When the received OTP matches the generated OTP, the server authenticates the concerned user.

However, a malicious application, known as a Man-In-the-Browser (or MIB), installed on the PC of such a known solution, intercepts the OTP and uses the intercepted OTP to authenticate to the server at the expense of the genuine user.

In addition to the vulnerabilities described above, such methods also have user interface inconvenience in that the user has to manually type the OTP for the authentication. Another method may have an access device prompt a user for a username and password that causes a push notification to be sent on the user's mobile device for multifactor authentication. Such push schemes may be subject to push fatigue and push scams that further inconvenience the user. Other methods may use a separate device such as a smart card and smart card reader that further involves a huge overhead in terms of PKI management and additional cost for hardware.

U.S. Pat. No. 11,177,963 granted on Nov. 16, 2021 to Thales DIS France, SA, the current assignee herein, discloses a server that accesses a user identifier associated with a first user device and a reference image as a first image set, to be displayed. The server sends to a second user device an image, as a second image set, to be displayed, and a user request to select an image within the first image set. The second user device displays the second image set and the user request. The user of the first user device selects at least one displayed first image, the selected first image matching an image visually selected within the displayed second image set, according to a rule known to the user and the server. The first user device sends to the server the first user device identifier accompanied with data relating to the selected first image. If the data relating to the selected first image matches the data relating to the first reference image, the server authenticates the user.

U.S. patent Ser. No. 10/263,973 granted on Apr. 16, 2019 to Thales DIS France, SA, the current assignee herein, discloses a first device that generates a first signature by using complete transaction data received from a second device, a first algorithm and a first key, modifies at least one character from the complete transaction data and gets partial transaction data, and sends to the second device the partial transaction data. The second device requests a user to modify the partial transaction data by providing at least one character, as complementary data to the partial transaction data, gets, as request response from a user, at least one character to modify the partial transaction data, a corresponding result being proposed modified transaction data, generates a second signature by using the proposed modified transaction data, the first algorithm and the first key, and sends to the first device the second signature. Only if the second signature does match the first signature, then the first device authorizes to carry out a corresponding transaction.

There is a need of an alternative solution for authenticating a user while being more or as secure than such aforementioned known solutions and further provides flexibility in terms of authenticating when the connection to a remote authentication server is offline that further provides a friendlier user interface.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

SUMMARY

In some embodiments, a method of image-based login authentication of a user on an access device using a mobile device registered to the user can include receiving login information at the access device, displaying an image reference at the access device, the image reference being one among a plurality of image references provisioned at the mobile device and an authentication authority, displaying the image reference selected by the authentication authority for matching at the mobile device along with other image references among the plurality of image references provisioned at the mobile device, and receiving an authentication token at the authentication authority from the mobile device corresponding to a selection at the mobile device of one of the plurality of image references provisioned at the mobile device. The method can further include receiving validation by the access device of a completed authentication if the selection matches the image reference displayed at the access device and allowing login at the access device if the authentication token is validated.

In some embodiments, the mobile device uses an authentication application to provision the plurality of image references on the mobile device, display at least a portion of the plurality of image references including the image reference, and enable a selection of the image reference among the plurality of image references.

In some embodiments, the mobile device submits the authentication token that includes data from the image reference to the authentication authority.

In some embodiments, the mobile device submits the authentication token that includes encrypted session keys to the authentication authority.

In some embodiments, the mobile device submits the authentication token including encrypted session keys to an authentication server serving as the authentication authority. In some embodiments, the access device receives confirmation of validation of the authentication token validated by the authentication server.

In some embodiments, the mobile device submits the authentication token to the access device serving as the authentication authority, and the access device checks the validity of the authentication token to grant access to the access device. In some embodiments, the mobile device derives session keys in response to determining an offline mode and sends an encrypted response to the access device using the session keys whereupon the access device decrypts the response using derived session keys to validate the encrypted response.

In some embodiments, the mobile device submits the authentication token including encrypted session keys to the authentication authority and wherein the authentication authority decrypts the session keys and validates the authentication token if the selection matches the image reference displayed at the access device In some embodiments, in response to determining an offline mode or a partial offline mode, the mobile device submits using a short distance wireless or wired protocol the authentication token as an encrypted message to the access device further using derived session keys at the mobile device and whereupon the access device forwards the encrypted message to an authentication server serving as the authentication authority, the authentication server decrypts the encrypted message and validates the response if a determination is made that the reference image selected matches the reference image displayed at the access device.

In some embodiments, the method rejects authentication if the authentication token is not validated by the authentication authority.

In some embodiments, an authentication application executing on the mobile device displays at least two among the plurality of image references including the image reference provisioned at the mobile device for selection by a user of the mobile device and wherein the authentication authority is either a remote authentication server or the access device itself and wherein the validation is completed by checking with the remote authentication server when the access device or the mobile device has communication access to the remote authentication server or by checking with the access device itself when neither the access device nor mobile device has access to the remote authentication server.

In some embodiments, a system of image-based login authentication of a user on an access device using a mobile device registered to the user can include one or more processors operatively coupled to memory having computer instructions which when executed by the one or more processors causes the one or more processors to perform certain functions including receiving login information at the access device, displaying an image reference at the access device, the image reference being one among a plurality of image references provisioned at the mobile device and provisioned at an authentication authority and generated by the authentication authority for selection, arranging for the display of the image reference selected by the authentication authority at the mobile device along with other image references among the plurality of image references for selection at the mobile device, and receiving an authentication token at the authentication authority from the mobile device corresponding to a selection from the mobile device of one of the plurality of image references provisioned and displayed at the mobile device. The system can further include the one or more processors performing the functions of receiving validation by the access device of a completed authentication if the selection matches the image reference displayed at the access device, and allowing login at the access device if the authentication token is validated.

In some embodiments, the mobile device submits the authentication token including encrypted session keys to an authentication server serving as the authentication authority and wherein the authentication server decrypts the session keys and validates the authentication token if the selection matches the image reference displayed at the access device.

In some embodiments, the mobile device submits the authentication token including session encryption keys to the access device serving as the authentication authority and wherein the access device itself decrypts the session keys and validates the authentication token if the selection matches the image reference displayed at the access device.

In some embodiments, the mobile device derives session keys in response to determining an offline mode and sends an encrypted response to the access device using the session keys whereupon the access device decrypts the response using derived session keys to validate the encrypted response.

In some embodiments, in response to determining an offline mode, the mobile device submits the authentication token as an encrypted message to the access device further using derived session keys at the mobile device and whereupon the access device forwards the encrypted message to an authentication server serving as the authentication authority, the authentication server decrypts the encrypted message and validates the response if a determination is made that the reference image selected matches the reference image displayed at the access device.

In some embodiments, the mobile device submits the authentication token as the encrypted message to the access device using a wireless or wired communication protocol requiring close proximity selected among Bluetooth, Bluetooth Low Energy, Near Field Communication, or USB (Universal Serial Bus) in an offline mode or a partial offline mode.

In some embodiments, a system of image-based login authentication of a user on an access device separately using a mobile device registered to the user and having an authentication application providing a plurality of image references and enabling a selection of an image reference among the plurality of image references wherein the system includes one or more processors operatively coupled to memory having computer instructions which when executed by the one or more processors causes the one or more processors to perform certain functions. In some embodiments, the functions perform receiving login information at the access device, displaying the image reference at the access device, the image reference being one among a plurality of image references provisioned at the mobile device and identified for user selection by an authentication server, displaying the image reference selected by the authentication server for matching at the mobile device displayed along with other image references among the plurality of image references provisioned at the mobile device, receiving an authentication token at the authentication server from the mobile device corresponding to a user selection at the mobile device of one of the plurality of image references provisioned at the mobile device, receiving validation by the access device of a completed authentication if the authentication server validates the authentication token when the user selection matches the image reference displayed at the access device, and allowing login at the access device if the authentication token is validated.

In some embodiments, the system further encrypts the authentication token to provide an encrypted authentication token, and in response to receiving the encrypted authentication token, the authentication server derives session keys to decrypt the encrypted authentication token before validating the authentication token and sending confirmation of such validation to the access device.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 4A illustrates a graphic user interface displaying an image reference at an access device in accordance with the embodiments;

FIG. 4B illustrates a graphic user interface displaying a plurality of image references including the image reference displayed at the access device of FIG. 4A in accordance with the embodiments;

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

When accessing an Access Device resource (e.g. a desktop computer, laptop computer, a tablet, etc.), a mobile device (such as a mobile phone, laptop, notebook computer, tablet, etc.) can be used for user authentication instead of, or in addition to a username and password. There are several ways the Client Machine/Access Device (AD) authenticates users. For example, it either directly authenticates the credential or interacts with an Authentication Server (AS) and the mobile device to accomplish authentication through an out of band authentication channel.

Here are some strong authentication options that include either some additional user inconvenience, additional overhead, and/or additional hardware to accomplish:

1. Access Device prompts the User for the username and password. User manually enters them on the login screen. The Access Device then either authenticates the user credentials using cached credentials or communicates with the authentication server to verify the credentials.

2. Access Device prompts the User for username, password and One-Time Password (OTP) for multi-factor authentication (MFA).

3. Access Device prompts the User to insert a smart card to do public-key infrastructure (PKI) based authentication.

4. Access Device prompts the User for username and password and sends a push notification on the mobile device for MFA authentication.

All of the above options have some shortcomings. Option #1 above only relies a single "what you know" factor. Option #2 uses MFA however there is still the user interface or experience of the inconvenience of further having to manually type the OTP. Option #3 provides the strongest authentication, but there is a huge overhead requirement for smart card readers and PKI management. Option #4 also provides a secure MFA option with out-of-band authentication, however there is the issue of push fatigue and push spams.

The embodiments herein solve the shortcomings of push fatigue and provide a better user experience. The embodiments disclosed also work when the access device or mobile phone or both are offline and not connected to the Internet.

Figure 1:
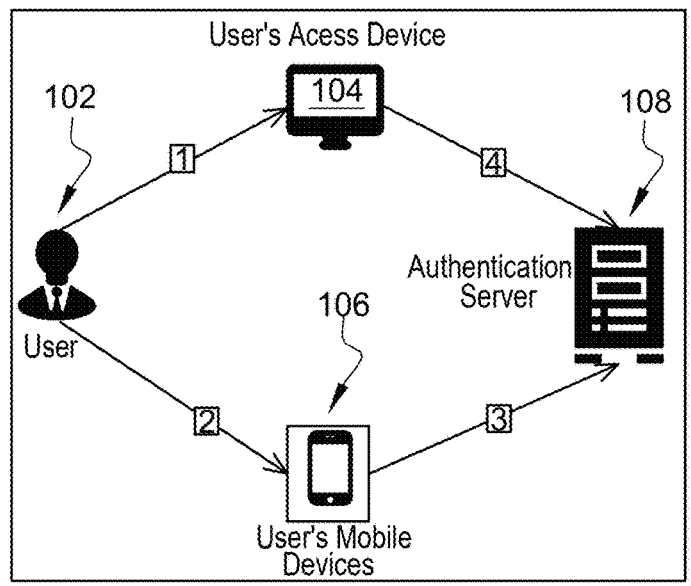
FIG. 1 illustrates a system of image-based login authentication of a user on an access device using a mobile device in an online mode in accordance with the embodiments.
Figure 2:
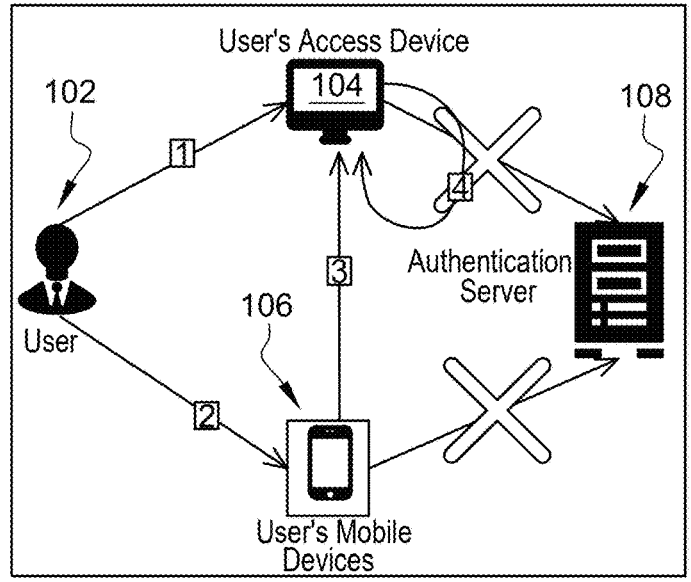
FIG. 2 illustrates the system of FIG. 1 in an offline mode in accordance with the embodiments.
Figure 3:
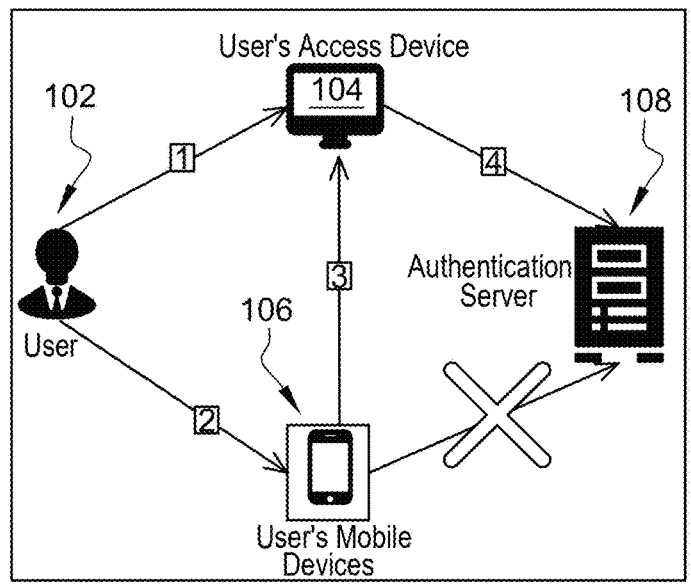
FIG. 3 illustrates the system of FIG. 1 in a partial offline mode in accordance with the embodiments.

The embodiments herein use a new authentication interaction flow that does not rely on any of the existing methods such as SMS, push notification, use of camera for QR code, or entering a text code on mobile device. With this new flow, the user can have a simple one-click interaction with their Access Device and with their (registered) mobile device. The mobile device can then send a response message to an Authentication Authority such as an Authentication Server using strong cryptographic keys. The following four parties or entities are involved in this design, as illustrated in FIGS. 1, 2 and 3. The design includes a User 102, a User's desktop (access device, AD) 104, a User's mobile device 106 and an Authentication server (AS) 108.

FIG. 1 illustrates a high-level user authentication flow 100 in an online mode. At step 1, the user goes to the access device 104 and enters a user identifier and the access device 104 displays an image to match. At step 2, the user opens an image authentication application on their mobile device 106 and selects the image that matches the reference image displayed at the access device 104 and submits it. At step 3, the mobile application at the mobile device 106 submits an authentication token (corresponding to the matched reference image) to an application server 108. At step 4, the access device 104 checks with the authentication server 108 to validate the authentication results and subsequently allows the user to login or rejects the authentication if the authentication fails.

FIG. 2 illustrates a high-level authentication flow 200 in an offline mode where no access exists to the authentication server 108 either via the mobile device 106 or via the access device 104. At step 1, the user goes to the access device 104 and enters a user identifier and the access device 104 displays an image to match. At step 2, the user opens an image authentication application on their mobile device 106 and selects the image that matches the reference image displayed at the access device 104 and submits it. At step 3, the mobile application at the mobile device 106 submits an authentication token (corresponding to the matched reference image) to the access device 104 instead of the application server 108 as in flow 100 of FIG. 1. At step 4, the access device 104 checks and validates the authentication results locally and subsequently allows the user to login or rejects the authentication if the authentication fails.

FIG. 3 illustrates a high-level authentication flow 300 in a partial offline mode where no access exists to the authentication server 108 via the mobile device 106, but access exist to the authentication server 108 via the access device 104. At step 1, the user goes to the access device 104 and enters a user identifier and the access device 104 displays an image to match. At step 2, the user opens an image authentication application on their mobile device 106 and selects the image that matches the reference image displayed at the access device 104 and submits it. At step 3, the mobile application at the mobile device 106 submits an authentication token (corresponding to the matched reference image) to the access device 104 instead of the application server 108. At step 4, the access device 104 checks and validates the authentication results with the authentication server 108 and subsequently allows the user to login or rejects the authentication if the authentication fails Referring to the system 400 of FIG. 4A, the Access Device 104 includes a login agent that displays a reference image 402 (it can be a picture, photo, icon, text, numbers or any graphical information) on the Access Device screen where the user is trying to gain access. The user will need to match this image 402 with one of the images from their mobile device application on the mobile device 106. See FIG. 4B for an illustration of this match process. The user will need to select the reference image 402 from among a plurality 452 of images (that can also serve as reference images in the future).

Each image is associated with a dataset that contains information like challenge, transaction identifier, validity date, etc. Those data set are either for one time use only, or reusable based on policy. In other words, the reference image when appropriately selected on the mobile device 402 serves as an authentication token.

Once used, the dataset is removed from the mobile application as well as from the backend server.

The dataset can either be:

1) Embedded in the graphical display. In this case the mobile application can retrieve the dataset (challenge, transaction identifier, etc.) to be used for cryptographic operation by extracting them from the image.

OR

2) Referenced from an external source. For example, the dataset could refer to the image to be displayed so that the application can match image and data associated.

Those data transmitted via the graphical display that are matching are then used as part of the input data used for the cryptogram calculation to be returned to the authentication server (or authentication authority) for validation. Based upon the image selected, the associated or embedded data set is used as input for the cryptogram calculation to be returned to the authentication server for validation.

Figure 5:
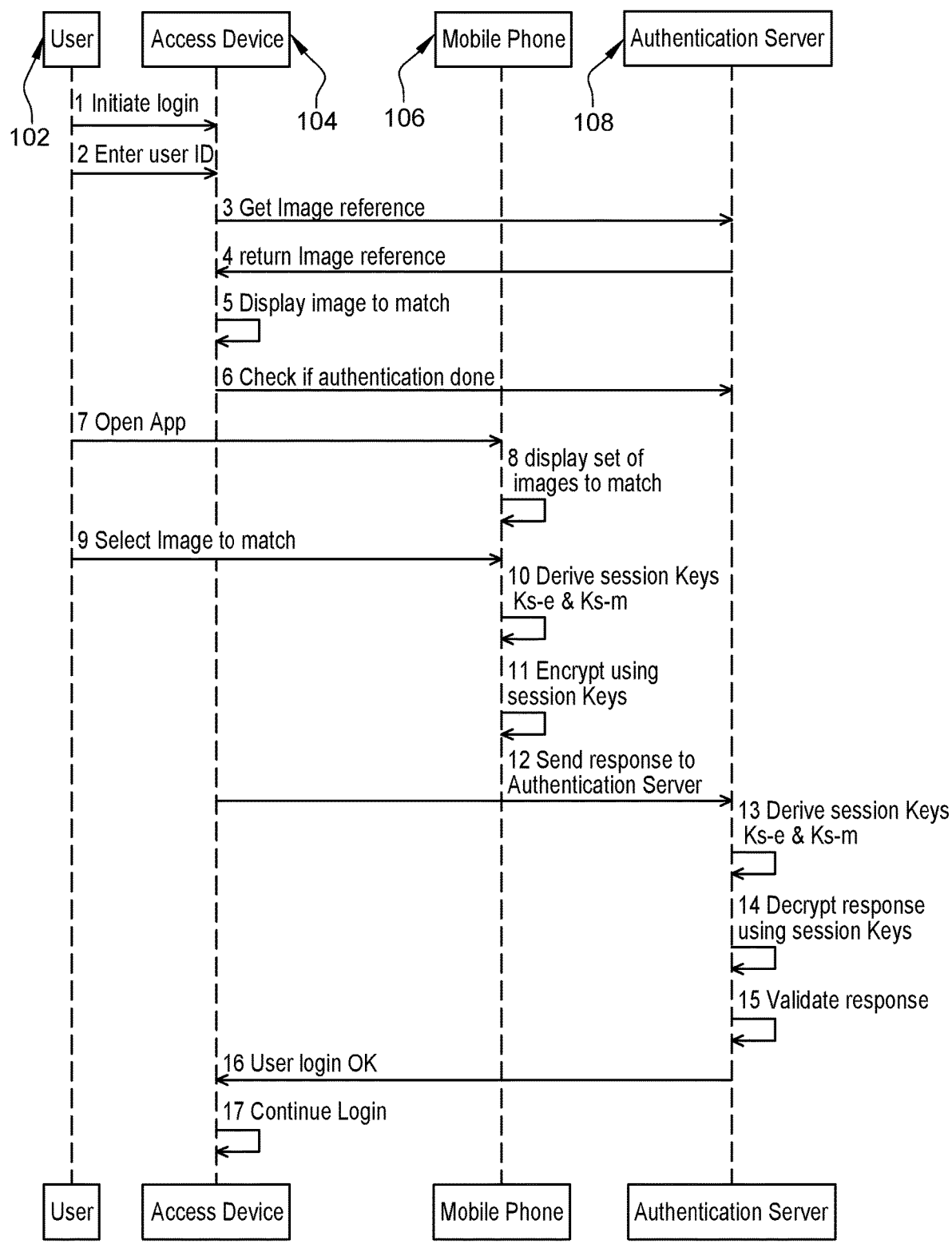
FIG. 5 illustrates a flow of information between a user, an access device, a mobile device, and an authentication server in a system in an online mode in accordance with the embodiments.
Figure 6:
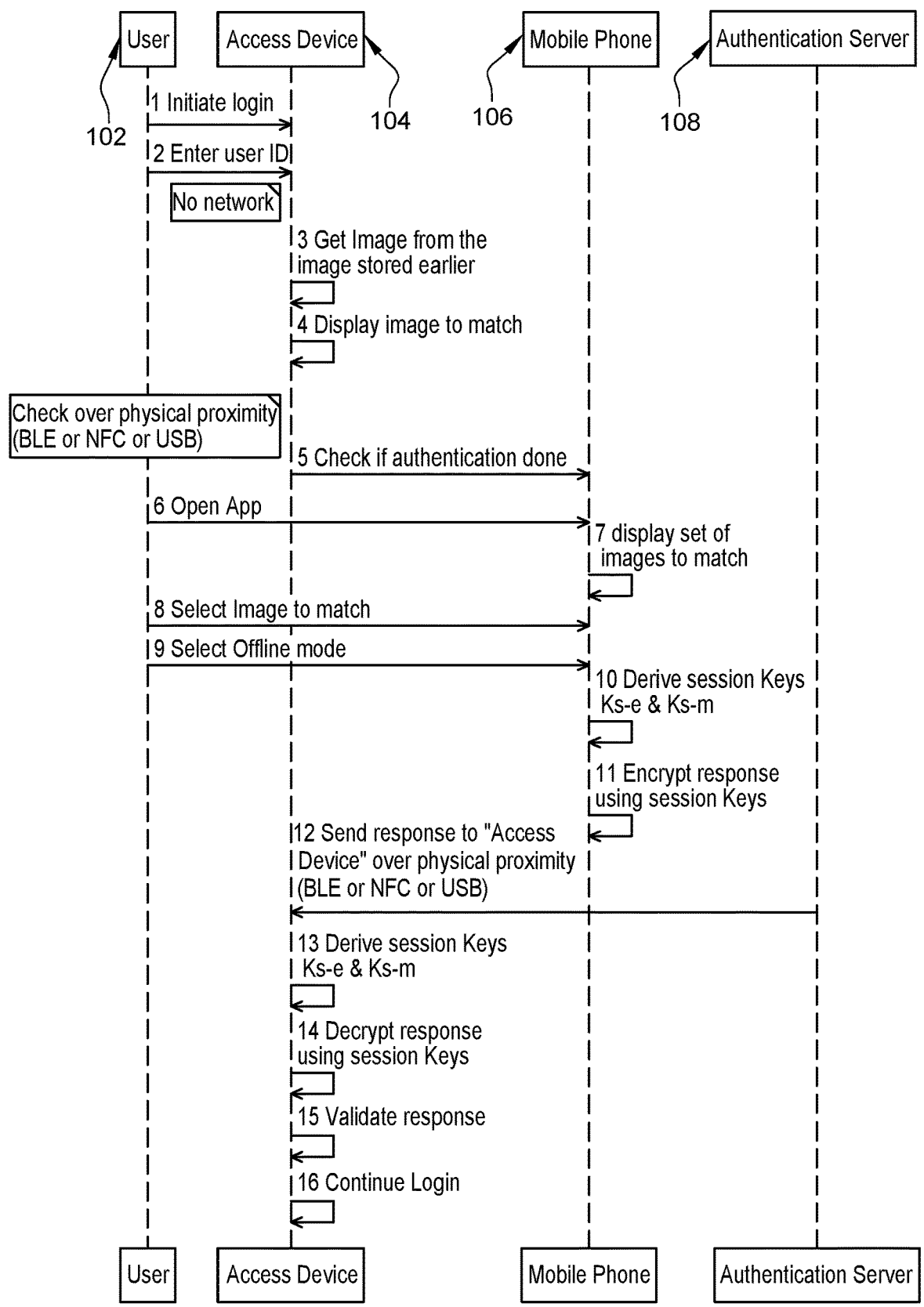
FIG. 6 illustrates a flow of information between a user, an access device, a mobile device, and an authentication server in a system in an offline mode in accordance with the embodiments.
Figure 7:
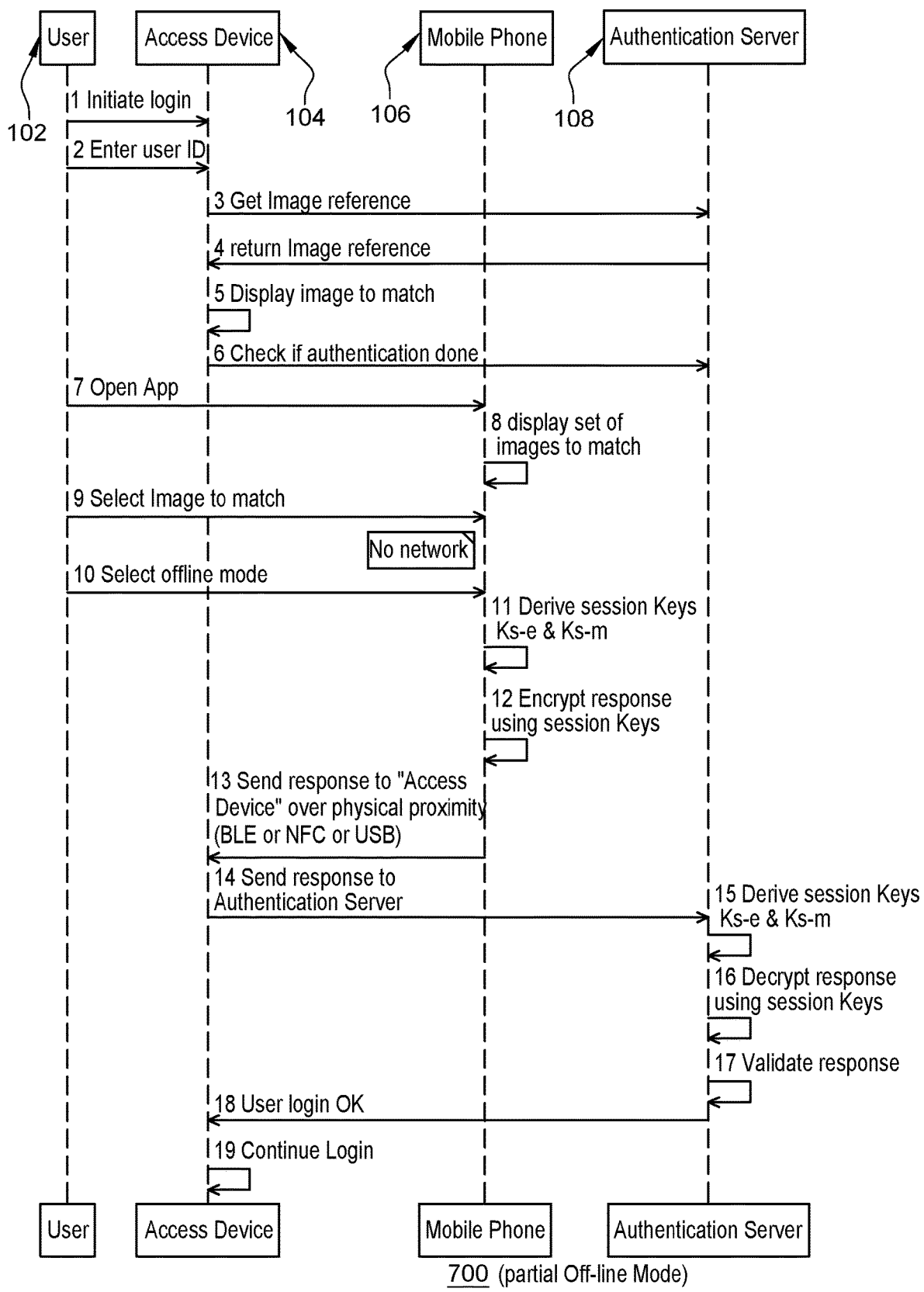
FIG. 7 illustrates a flow of information between a user, an access device, a mobile device, and an authentication server in a system in a partial offline mode in accordance with the embodiments.
Figure 8:
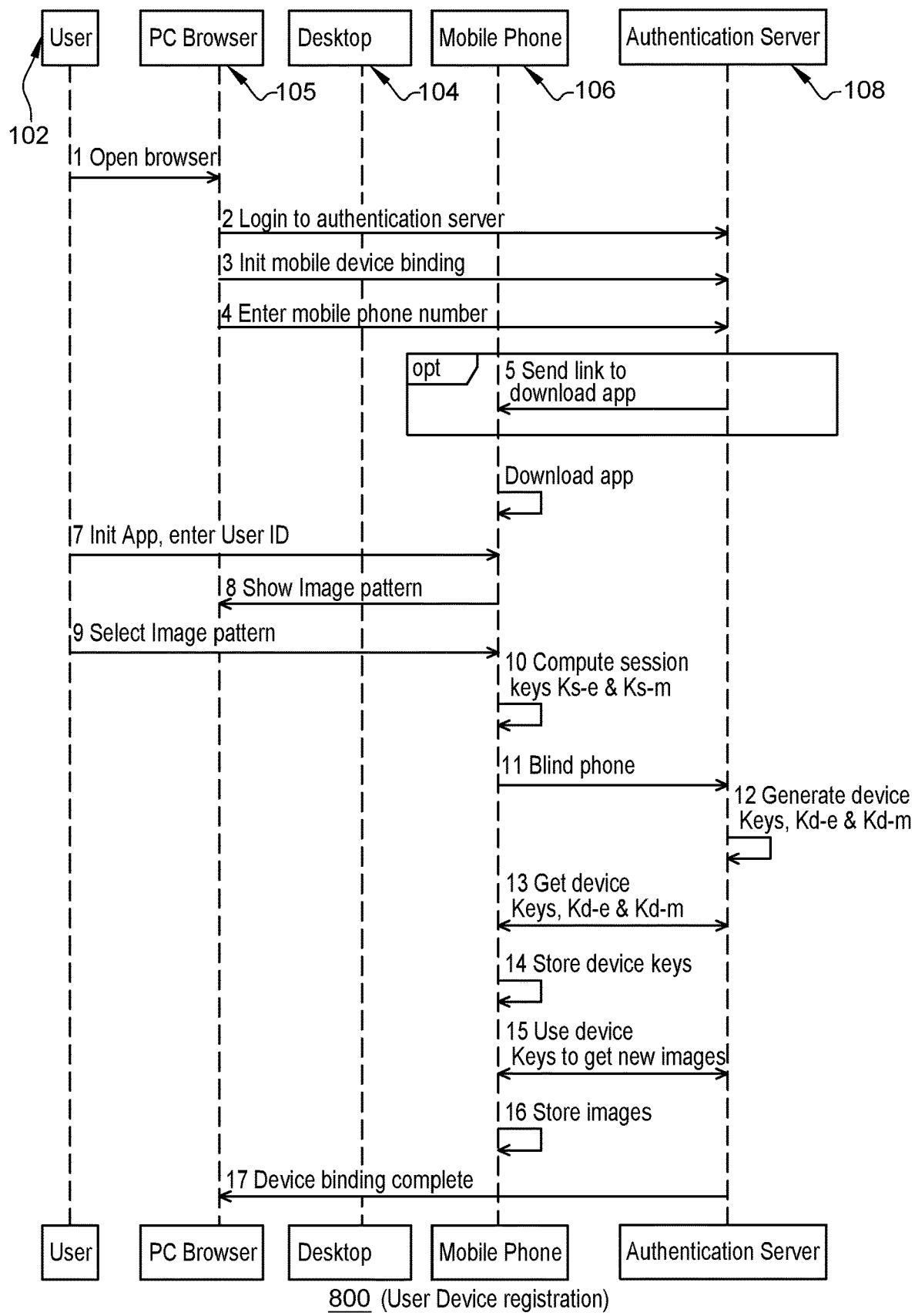
FIG. 8 illustrates a flow of information between a user, an access device, a mobile device, and an authentication server in a system in an user device registration mode in accordance with the embodiments.
Figure 9:
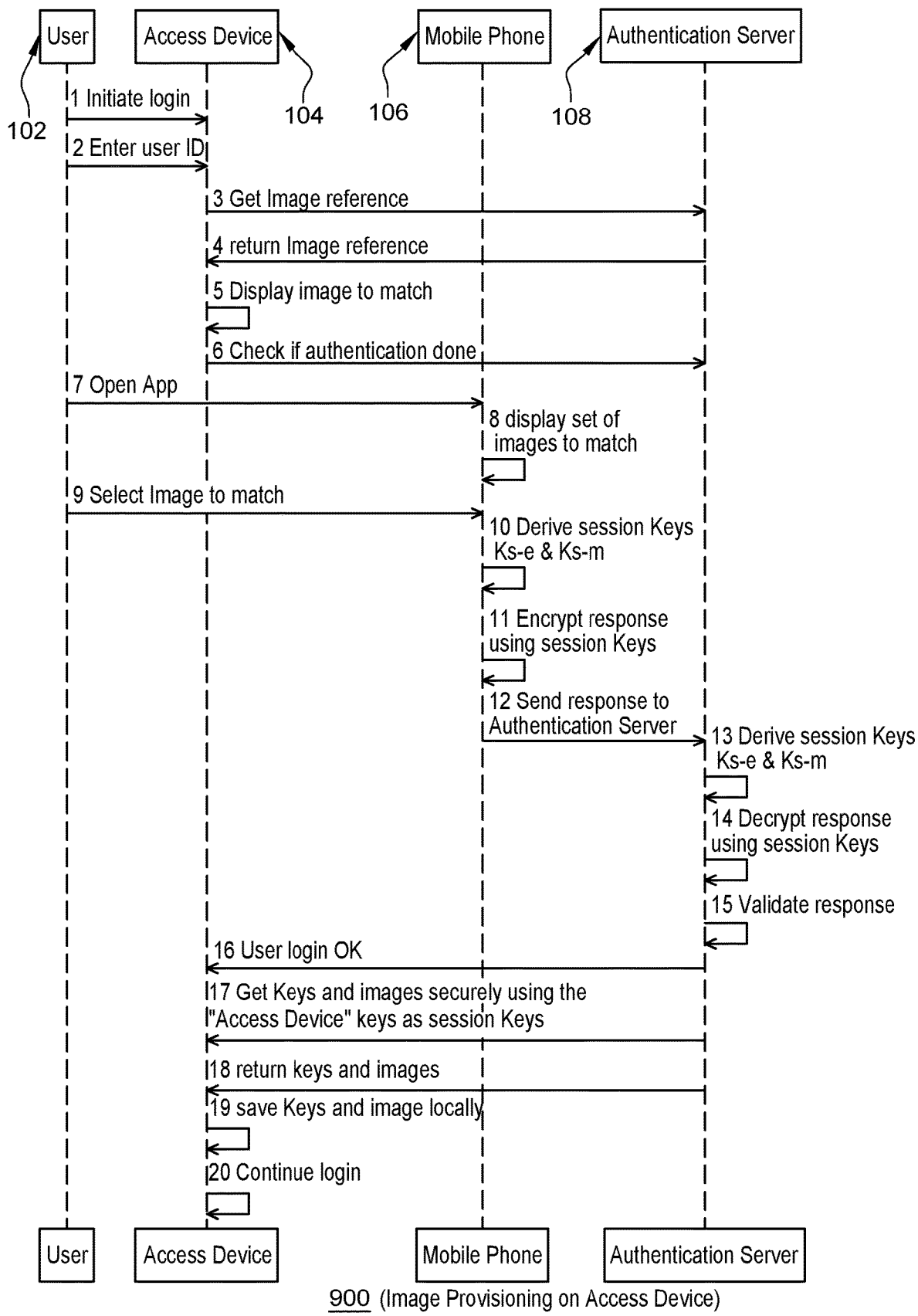
FIG. 9 illustrates a flow of information between a user, an access device, a mobile device, and an authentication server in a system in an image provisioning mode on an access device in accordance with the embodiments.
Figure 10:
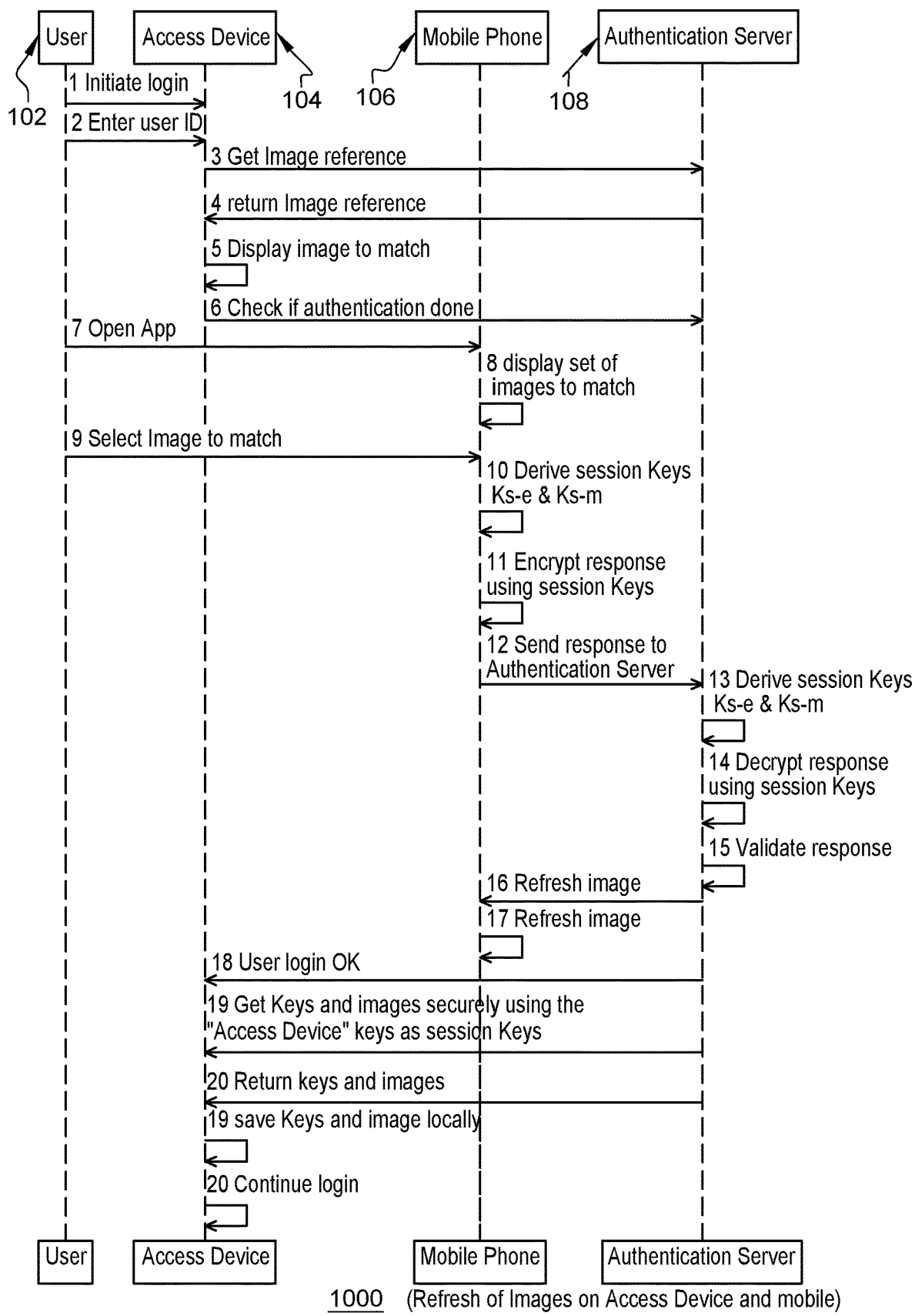
FIG. 10 illustrates a flow of information between a user, an access device, a mobile device, and an authentication server in a refresh of images mode on an access device or mobile in accordance with the embodiments.

FIGS. 5, 6, and 7 a more detailed flow of the online, offline, and partial offline modes. FIG. 8 further details the flow and process of registering a user's mobile device in accordance with the embodiments and FIG. 9 illustrates the process of image provisioning on the access device 104. FIG. 10 illustrates the process of refreshing images on the access device 104 and on the mobile device 106.

Online Authentication

The flow 500 of FIG. 5 demonstrates how the authentication is done when the user is connected to the network. It relies on the device specific information already exchange during device registration/binding (as further illustrated in the flow 800 of FIG. 8).

FIG. 1 demonstrated a high-level flow 100, and the flow 500 in FIG. 5 illustrates the corresponding detailed steps for user login (aka authentication) using the mobile App in an online mode. The numbered steps illustrated in the flow 500 are further explained below.

1. User 102 goes on the Access Device 104 that they want to authenticate and login to.

2 User enters their unique ID in the Access Device login window. This can typically be a username or a phone number.

3. The Access Device 104 invokes the authentication server 108 to initiate authentication, the Access Device 104 sends the UserID in the authentication request. The Authentication Server 108 can identify the mobile device 104 to which this account belongs. This binding should already have been completed.

4. The authentication server 108 returns the reference image (402) to the access device 104 to use for image matching during the authentication.

5. The Access Device 104 displays this single image in the login window. This image is taken from N images (see 402 and 452 in FIG. 4B) that are already provisioned on the mobile App. User 102 is instructed to open the mobile device application and to match the displayed image with a corresponding image shown on the mobile phone 106. See FIG. 4A for a visual example.

6. The Access Device 104 polls the authentication server 108 for authentication completion or timeout.

7. The user 102 opens his mobile App from their mobile phone 106.

8. The mobile app displays a set of images including the reference image 402.

9. The user 102 then selects the image shown in step #5 above, from the many images in the mobile App. See FIG. 4B for a visual example of this display.

10. Once user 102 has selected the image, the mobile App derives two session keys: Ks-e and Ks-m. One is for encryption and one for integrity of message to be sent to Authentication Server 108. The derivation is based on a key derivation function that takes three inputs: the image selected, and device key Kd-e or Kd-m, and a random nonce. The nonce ensures that the input to session key derivation are different each time, even if the same image is selected for multiple authentication attempts. As such, the session key will also be different.

11. Using the session keys, Ks-e and Ks-m, the mobile App encrypts the response message which serves as an Authentication Token. The contents of this response message can include the selected image itself, a Yes or No to the login request, along with some meta-data. A timestamp can also be added to prevent replay attacks. The contents of the response message can contain all or a portion of the aforementioned.

12. The encrypted response is send to the Authentication Server 108 over Transport Layer Security (TLS) which encrypts data over the internet to ensure that eavesdroppers and hackers are unable to see the underlying data. The nonce used in step 10 and the UserID are sent to Authentication Server 108 in the "clear", as part of the response header.

13. The Authentication Server 108 knows the phone number from which the response is coming, and also gets user ID from response header. It first does its own derivation of session keys Ks-e and Ks-m. It has all the information it needs to do this: User Id, nonce, and image that the user 102 should have selected 14. Using its own version of session keys, the Authentication Server 108 now decrypts the response from mobile App.

15. If response is valid, user 102 is allowed to login.

16. Authentication server 108 responds to Access Device 104 with a successful authentication result. This is in response to polling request in step #6.

17. Access Device 104 continues to log in the user 102 using pre-provisioned User certificate.

Offline Authentication

The flow 600 of FIG. 6 demonstrates how the authentication is done when the user is not connected to the network. It relies on the device specific information already exchanged during device registration/binding (again, see FIG. 8).

FIG. 2 demonstrated a high-level flow 200, and the flow 600 in FIG. 6 illustrates the corresponding detailed steps for user login (aka authentication) using the mobile App in an offline mode. The numbered steps illustrated in the flow 600 are further explained below.

1. User 102 goes on the Access Device 104 which he wants to authenticate and login to.

2. User 102 enters his unique ID in the Access Device login window of the access device 104. This can be a username or a phone number.

3. If the Access Device 104 determines that no connectivity to the Authentication Server 108 exists, then the Access Device 104 falls back to an offline mode and gets the image sets stored earlier on the system.

4. The Access Device 104 displays a single image (taken from this image set) in the login window. This image is taken from N images that are already provisioned on the mobile App on the mobile device 106. User 102 is instructed to open the mobile device application and to match the displayed image with a corresponding image shown on the mobile device 106. See FIG. 4A for a visual example.

5. The Access Device 104 polls the mobile device 106 over PHYSICAL PROXIMITY (BLE, NFC, USB) to check if the authentication is done. The physical proximity can be wireless or wired.

6. The user 102 opens their mobile App from their mobile device 106.

7. The app displays a set of images.

8. The user then selects the reference image shown in step #4 from the many images shown in the mobile App. See FIG. 4B for a visual example of this display.

9. The User 102 selects an offline mode. Alternatively, mobile device 106 can determine it is in off-line mode. Since the access device does not have connectivity to the authentication server it is necessarily in an offline mode. The user must select the offline mode. Generally, the mobile device cannot determine using connectivity here because even if the mobile device 106 has connectivity to the authentication server 108, the mobile device 106 still needs to fall back to offline mode because there is no way the access device 104 can verify with authentication server 108.

10. Once the user 102 has selected the image, the mobile App derives two session keys: Ks-e and Ks-m. One is for encryption and one for integrity of message to be sent to Access Device over PHYSICAL PROXIMITY (BLE, NFC, USB). The derivation is based on a key derivation function that takes three inputs: image selected, and device key Kd-e or Kd-m, and a random nonce. The nonce ensures that the input to session key derivation are different each time, even if the same image is selected for multiple authentication attempts. As such the session key will also be different.

11. Using the session keys, Ks-e and Ks-m, the mobile App encrypts the response message. The contents of this response message can include the selected image itself, a Yes or No to the login request, along with some meta-data. A timestamp can also be added to prevent replay attacks. The contents of the response message can contain all or a portion of the aforementioned.

12. The encrypted response is send back to the Access Device 104 over PHYSICAL PROXIMITY (BLE, NFC, USB). The nonce used in step #6 and the user ID are sent to Access Device 106 in the "clear".

13. The Access Device 104 knows the mobile device from which the response is coming, and also gets user ID from the response. It first does its own derivation of session keys Ks-e and Ks-m. It has all the information it needs to do this: User ID, nonce, and image that the user 102 should have selected 14. Using its own version of session keys, the Access Device 104 now decrypts the response from mobile App.

15. If response is valid, user 102 is allowed to login.

16. The Access Device 104 continues to log in the user 102 using pre-provisioned User certificate. The use of a pre-provisioned user certificate is specific to Windows logon, however for other operating systems the mechanism could be different and the embodiments herein can be modified within contemplation of the embodiments of the claims accordingly.

Partial Offline Authentication

The flow 700 of FIG. 7 demonstrates how the authentication is done when the user mobile 106 is not connected to the network but the access device 104 still has network access. It relies on the device specific information already exchanged during device registration/binding (again, see FIG. 8).

FIG. 3 demonstrated a high-level flow 300, and the flow 700 in FIG. 7 illustrates the corresponding detailed steps for user login (aka authentication) using the mobile App in a partial offline mode where the Access device 104 is online but the mobile device 106 is offline. The numbered steps illustrated in the flow 700 are further explained below.

1. The User 102 goes on the Access Device 104 that they want to authenticate and login to.

2. User 102 enters their unique ID in the Access Device login window. This can typically be a username or a phone number.

3. The Access Device 104 invokes the authentication server 108 to initiate authentication, the Access Device 104 sends the UserID in the authentication request. The Authentication Server 108 can identify the mobile device 106 to which this account belongs. This binding should already have been completed.

4. The authentication server 108 returns the reference image (402) to use for image matching during the authentication 5. The Access Device 104 displays this single image in the login window. This image is taken from N images that are already provisioned on the mobile App. User 102 is instructed to open the mobile device application and to match the displayed image with a corresponding image shown on the mobile device 106. See FIG. 4A for a visual example.

6. The Access Device 104 polls the authentication server 108 for authentication completion or timeout.

7. The user 102 opens their mobile App from their mobile device 106.

8. The app displays a set of images.

9. The user 102 then selects the image shown in step #5, from the many images in the mobile App. See FIG. 4B for a visual example of this display.

10. User 102 selects offline mode

11. Once user has selected the image, the mobile App derives two session keys: Ks-e and Ks-m. One is for encryption and one for integrity of message to be sent to Access Device 104 over PHYSICAL PROXIMITY (BLE, NFC, USB). The derivation is based on a key derivation function that takes three inputs: image selected, and device key Kd-e or Kd-m, and a random nonce. The nonce ensures that the input to session key derivation are different each time, even if the same image is selected for multiple authentication attempts. As such the session key will also be different.

12. Using the session keys, Ks-e and Ks-m, the mobile App encrypts the response message. The contents of this response message can include the selected image itself, a Yes or No to the login request, along with some meta-data. A timestamp can also be added to prevent replay attacks. The contents of the response message can contain all or a portion of the aforementioned.

13. The encrypted response is send to the Access Device 104 over PHYSICAL PROXIMITY (BLE, NFC, USB). The nonce used in step #6 and the user ID are sent to Access Device 104 in the "clear".

14. The Access Device 104 forwards the encrypted authentication payload received from the mobile device 106 to the authentication server 108.

15. The Authentication Server 108 knows the phone number/access device (106) from which the response is coming, and also gets user ID from the response header. It first does its own derivation of session keys Ks-e and Ks-m. It has all the information it needs to do this: User Id, nonce, and image that the user 102 should have selected 16. Using its own version of session keys, the Authentication Server 108 now decrypts the response from mobile App.

17. The authentication server 108 validates the authentication payload.

18. If response is valid, the authentication server 108 responds to the access device with login OK.

19. The Access Device 104 continues to log in the user 102 using pre-provisioned User certificate. As previously mentioned, other operating systems besides Windows may use a different mechanism to continue to log in the user.

Mobile Device Registration

This section describes how images/dataset are loaded in the mobile App.

FIG. 8 depicts the steps for mobile device registration and how images and datasets are loaded in the mobile application on the mobile device 106. This is required before the mobile device 106 can be used in online authentication. It shows how device specific keys are loaded in the mobile App, along with device specific image sets. These steps are explained below:

1. User opens a web browser 105 on the PC (which will be the access device 104).

2. The user 102 authenticates to the Authentication Server (AS) 108.

3. The user 102 then initiates the process to bind their mobile device 106 to their online account at the Authentication Server 108.

4. First step in this binding process is to enter the mobile device phone number.

5. Optionally the AS 108 can use this phone number to send an SMS link to the mobile device 106. This link is to download the mobile App. Alternatively, the user 102 can search for this App from the mobile device 106.

6. The user 102 downloads the App to the mobile device 106. This App is a vanilla App, with no user specific data. It does however contain a predetermined number of stock image sets such as 10 stock image sets. These are the same image that all Apps will have. In addition the App has a shared secret key Ks, which is also the same for all Apps. The App will be customized to user specific values in the following steps.

7. To initialize the App, user 102 enters his unique ID, e.g. phone number. Or the App could automatically retrieve it up from phone.

8. The AS 108 in the meantime has displayed a series of number of images such as four (4) images. These images are picked randomly from the list of 10 stock images each App has. The user is asked to open their mobile App and select the same images, in the same order.

9. The user 102 opens the mobile App (downloaded and initialized in steps 5, 6). The user 102 then selects the same images pattern on the mobile device 106 as shown on the PC browser screen (105).

10. Based on this selection, the mobile App computes two session keys: K-e and K-m. These two keys are used to establish a secure connection with Authentication Server 108. K-e is for encryption, and K-m is for message integrity. Computation of K-e and K-m is based on a key derivation function that takes three inputs: User ID, image pattern selected by user, and Ks. All three values are known to the backend server AS 108. As such, the Authentication Server 108 can also compute the same values of K-e and K-m. This makes the secure handshake indicated in steps 10, and 12 possible.

11. The mobile App sends a message to the Authentication Server 108 to bind the mobile App to the user account. The message is constructed as follows:

Message=UserID+Encrypt{PhoneNumber+ UserID}$K\text{-}e, K\text{-}m$

Note that the phone number and UserID are encrypted using the generated session keys, K-e and K-m. UserID in the clear is added to the start of the message so the Authentication Server 108 can use it to compute K-e and K-m itself. The entire message is sent over TLS which offers transport level security. As such, the clear UserID is still protected in transit by TLS.

12. The Authentication Server 108 reads UserID from the start of the message, and uses this to generate session keys K-e and K-m itself. It then uses these keys to decrypt the encrypted payload and matches the UserID and phone number. Once this is confirmed, it now generates two device specific keys for this device: Kd-e and Kd-m, one for encryption and one for integrity of messages. These keys are stored on the server 108, indexed to the user ID.

13. These new device keys are sent to mobile App. This exchange is still protected by session keys, K-e and K-m.

14. The mobile App stores these device keys locally. All subsequent exchange with Authentication Server 108 will be done using these device specific keys.

15. The first use of these device keys is to get device specific images from the server 108. The server 108 either generates the image or pulls it from its database. In either case images are stored on the server 108, index to the User ID, and also sent to the mobile device 106.

16. The mobile App stores these images locally. The authentication will use these new images instead of the stock images that came with App.

17. The Authentication Server indicates to the user 102 that device binding is completed. The user 102 can now use their mobile device 106 for strong out-of-band authentication.

Access Device Image Provisioning

FIG. 9 depicts a flow 900 of how images/dataset are loaded on the Access Device 104. It relies on the device specific information already exchanged during device registration/binding explained above with respect to FIG. 8. The numbered steps illustrated in the flow 900 are further explained below.

1. The User 102 goes on the Access Device 104 that they want to authenticate and login to.

2. The User 102 enters their unique ID in the Access Device login window. This can be a username or a phone number.

3. The Access Device 104 invokes the authentication server 108 to initiate authentication, the Access Device 104 sends the userid in the authentication request. The Authentication Server 108 can identify the mobile device 106 to which this account belongs. This binding should already have been completed.

4. The authentication server 108 returns the reference image to use for image matching during the authentication 5. The Access Device 104 displays a single image in the login window. This image is taken from N images that are already provisioned on the mobile App. The User 102 is instructed to open the mobile device application and to match the displayed image with a corresponding image shown on the mobile device 106. See FIG. 4A for a visual example.

6. The Access Device 104 polls the authentication server 108 for authentication completion or timeout.

7. The user 102 opens their mobile App from their mobile device 106.

8. The app displays a set of images.

9. The user then selects the image shown in step #5, from the many images in the mobile App. See FIG. 4B for a visual example of this display.

10. Once the user 102 has selected the image, the mobile App derives two session keys: Ks-e and Ks-m. One is for encryption and one for integrity of message to be sent to Authentication Server 108. The derivation is based on a key derivation function that takes three inputs: image selected, and device key Kd-e or Kd-m, and a random nonce. The nonce ensures that the input to session key derivation are different each time, even if the same image is selected for multiple authentication attempts. As such the session key will also be different.

11. Using the session keys, Ks-e and Ks-m, the mobile App encrypts the response message. The contents of this response message are Yes or No to the login request, along with some meta-data. A Timestamp can also be added to prevent replay attacks.

12. The encrypted response is send back to the Authentication Server 108 over TLS. The nonce used in step 10 and the user ID are sent to Authentication Server 108 in the "clear", as part of the response header.

13. The Authentication Server 108 knows the phone number from which the response is coming, and also gets user ID from response header. The authentication server 108 first does its own derivation of session keys Ks-e and Ks-m. It has all the information it needs to do this: User Id, nonce, and image that the user 102 should have selected 14. Using its own version of session keys, the Authentication Server 108 now decrypts the response from mobile App.

15. If response is valid, user is allowed to login.

16. The Authentication server 108 responds to the Access Device 104 with a successful authentication result.

17. The Access Device 104 requests the authentication server 108 for the images and session keys.

18. The Authentication server 108 returns the images and keys.

19. The Access Device 104 saves the images locally.

20. The Access Device 104 continues to log in the user 102 using pre-provisioned User certificate.

Image Refresh on Access Device and Mobile

FIG. 10 depicts a flow 1000 for user login (aka authentication) using the mobile App. More particularly, FIG. 10 describes how images/dataset are re-loaded/refreshed on the Access Device 104 and the mobile device 106. It relies on the device specific information already exchange during device registration/binding as described with respect to FIG. 8. The numbered steps illustrated in the flow 1000 are further explained below.

1. The User 102 goes on the Access Device 104 that they want to authenticate and login to.

2. The User 102 enters their unique ID in the Access Device login window. This can be a username or a phone number, for example.

3. The Access Device 104 invokes the authentication server 108 to initiate authentication, the Access Device 104 sends the userid in the authentication request. The Authentication Server 108 can identify the mobile device 106 to which this account belongs. This binding should already have been completed.

4. The authentication server 108 returns the reference image to use for image matching during the authentication 5. The Access Device 104 displays a single image in the login window. This image is taken from N images that are already provisioned on the mobile App. The User 102 is instructed to open the mobile device application and to match the displayed image with a corresponding image shown on the mobile device 106. See FIG. 4A for a visual example.

6. The Access Device 104 polls the authentication server 108 for authentication completion or timeout.

7. The user 102 opens their mobile App from their mobile device 106.

8. The app displays a set of images.

9. The user 102 then selects the image shown in step #5, from among the many images in the mobile App. See FIG. 4B for a visual example of this display.

10. Once user 102 has selected the image, the mobile App derives two session keys: Ks-e and Ks-m. One is for encryption and one for integrity of message to be sent to Authentication Server 108. The derivation is based on a key derivation function that takes three inputs: image selected, and device key Kd-e or Kd-m, and a random nonce. The nonce ensures that the input to session key derivation are different each time, even if the same image is selected for multiple authentication attempts. As such, the session key will also be different.

11. Using the session keys, Ks-e and Ks-m, the mobile App encrypts the response message. The contents of this response message are Yes or No to the login request, along with some meta-data. A Timestamp can also be added to prevent replay attacks.

12. The encrypted response is send back to the Authentication Server 108 over TLS. The nonce used in step 10 and the user ID are sent to the Authentication Server 108 in the "clear", as part of the response header.

13. The Authentication Server 108 knows the phone number from which the response is coming, and also gets user ID from response header. It first does its own derivation of session keys Ks-e and Ks-m. The authentication server 108 has all the information it needs to do this: User Id, nonce, and image that the user should have selected 14. Using its own version of session keys, the Authentication Server 108 now decrypts the response from mobile App.

15. The authentication server validates the authentication payload from the mobile 16. The authentication server 108 sends back the refreshed images and dataset associated with those images.

17. The Mobile app refreshes the images on the mobile device 106.

18. If response is valid, the user 102 is allowed to login.

19. The Access Device 104 requests the authentication server 108 for the images and session keys 20. The Authentication server 108 returns the images and dataset associated with those images 21. The Access Device 104 saves the images locally 22. The Access Device 104 continues to log in the user 102 using pre-provisioned User certificate.

Figure 11:
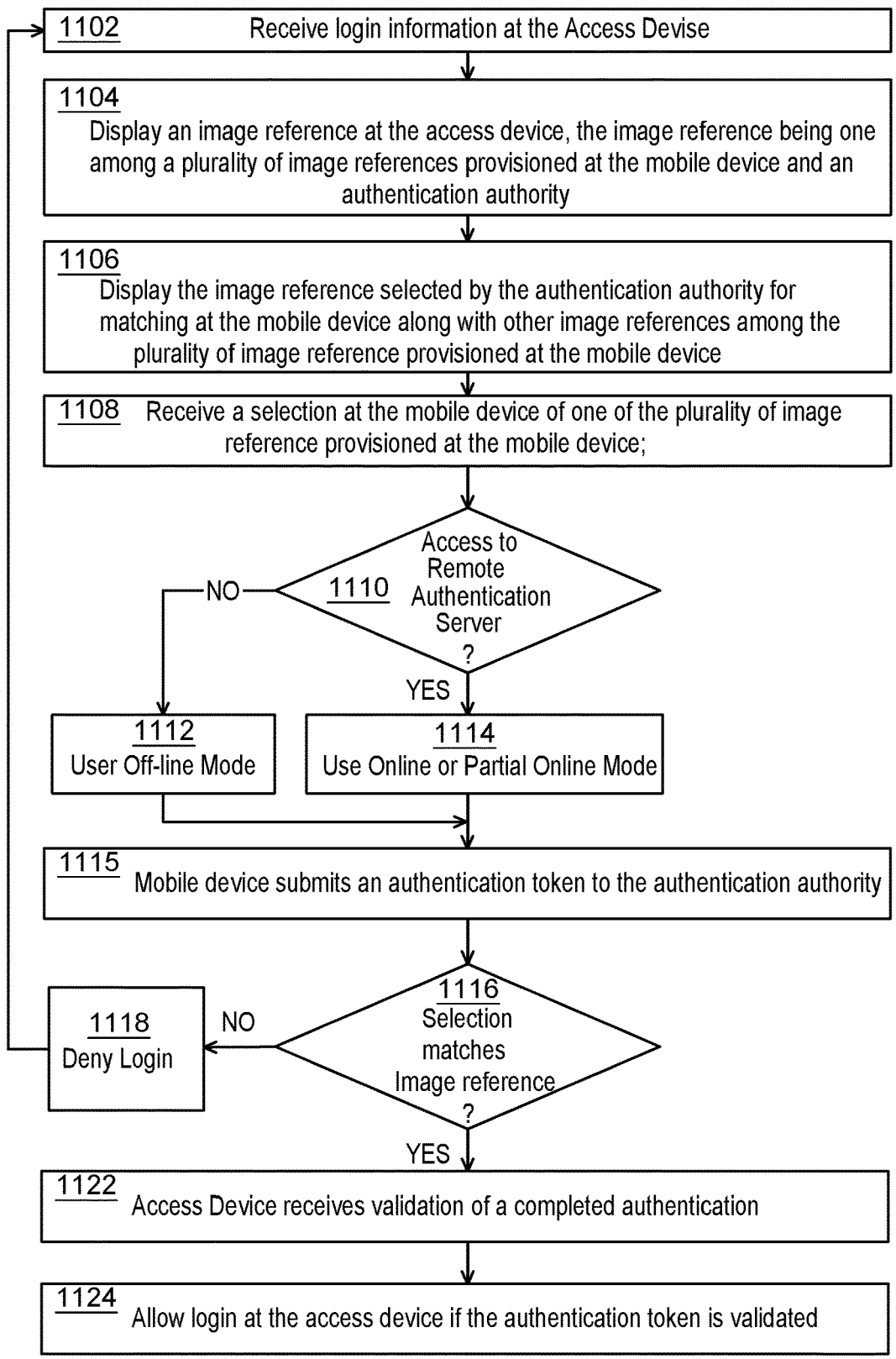
FIG. 11 is a flow chart illustrating a method of image-based login authentication of a user on an access device using a mobile device registered to the user.

In some embodiments and with further reference to FIG. 11, a method 1100 of image-based login authentication of a user on an access device using a mobile device registered to the user can include receiving at 1102 login information at the access device, displaying at 1104 an image reference at the access device, the image reference being one among a plurality of image references provisioned at the mobile device and an authentication authority, displaying at 1106 the image reference selected by the authentication authority for matching at the mobile device along with other image references among the plurality of image references provisioned at the mobile device, and receiving at 1115 an authentication token at the authentication authority from the mobile device corresponding to a selection (at step 1108) at the mobile device of one of the plurality of image references provisioned at the mobile device. The method can further include receiving at 1122 validation by the access device of a completed authentication if the selection matches the image reference displayed at the access device at decision block 1116 and allowing login at the access device if the authentication token is validated at step 1124.

In some embodiments, the mobile device uses an authentication application to provision the plurality of image references on the mobile device, to display at least a portion of the plurality of image references including the image reference, and to enable a selection of the image reference among the plurality of image references.

In some embodiments, the mobile device submits the authentication token that includes data from the image reference to the authentication authority as shown at step 1115.

In some embodiments, the mobile device submits the authentication token that includes encrypted session keys to the authentication authority as part of step 1115.

In some embodiments, the mobile device submits the authentication token including encrypted session keys to an authentication server serving as the authentication authority, again as part of step 1115. In some embodiments, the access device receives confirmation of validation of the authentication token validated by the authentication server.

In some embodiments, the mobile device submits the authentication token to the access device serving as the authentication authority at 1115, and the access device checks the validity of the authentication token to grant access to the access device in an offline mode at 1112 if there is no access to a remote authentication server at decision block 1110 or in an online or partial online mode at 1114 if there is access to the authentication server at decision block 1110. In some embodiments, the mobile device derives session keys in response to determining an offline mode at decision block 1110 and sends an encrypted response to the access device using the session keys whereupon the access device decrypts the response using derived session keys to validate the encrypted response.

In some embodiments, the mobile device submits as part of step 1115 the authentication token including encrypted session keys to the authentication authority and where the authentication authority decrypts the session keys and validates the authentication token if the selection matches the image reference displayed at the access device In some embodiments, in response to determining an offline mode or a partial offline mode, the mobile device submits using a short distance wireless protocol the authentication token as an encrypted message to the access device further using derived session keys at the mobile device and whereupon the access device forwards the encrypted message to an authentication server serving as the authentication authority, the authentication server decrypts the encrypted message and validates the response if a determination is made that the reference image selected matches the reference image displayed at the access device.

In some embodiments, the method rejects authentication if the authentication token is not validated by the authentication authority. In some embodiments, the method denies login at 1118 when the selection of the image at the mobile device fails to match the image reference shown at the access device at decision block 1116.

In some embodiments, an authentication application executing on the mobile device 106 displays at least two among the plurality of image references including the image reference provisioned at the mobile device for selection by a user of the mobile device and where the authentication authority is either a remote authentication server or the access device itself and where the validation is completed by checking with the remote authentication server when the access device or the mobile device has communication access to the remote authentication server (1114) or by checking with the access device itself when neither the access device nor mobile device has access (1112) to the remote authentication server.

In some embodiments with further reference to FIGS. 1-7, a system (100, 200, or 300) of image-based login authentication of a user 102 on an access device 104 using a mobile device 106 registered to the user 102 can include one or more processors operatively coupled to memory having computer instructions which when executed by the one or more processors causes the one or more processors to perform certain functions including receiving login information at the access device 104, displaying an image reference 402 at the access device 104, the image reference being one among a plurality of image references (402, 452) provisioned at the mobile device 106 and provisioned at an authentication authority (104 and/or 108) and generated by the authentication authority for selection, arranging for the display of the image reference selected by the authentication authority at the mobile device 106 along with other image references among the plurality of image references for selection at the mobile device, and receiving an authentication token at the authentication authority from the mobile device 106 corresponding to a selection from the mobile device 106 of one of the plurality of image references provisioned and displayed at the mobile device. The system can further include the one or more processors performing the functions of receiving validation by the access device of a completed authentication if the selection matches the image reference displayed at the access device, and allowing login at the access device if the authentication token is validated as describe with method 1100 above.

In some embodiments, the mobile device 106 submits the authentication token including encrypted session keys to an authentication server 108 serving as the authentication authority and where the authentication server 108 decrypts the session keys and validates the authentication token if the selection matches the image reference 402 displayed at the access device 104.

In some embodiments, the mobile device 106 submits the authentication token including session encryption keys to the access device 104 serving as the authentication authority and where the access device itself decrypts the session keys and validates the authentication token if the selection matches the image reference displayed at the access device 104 in an offline mode.

In some embodiments, the mobile device 106 derives session keys in response to determining an offline mode and sends an encrypted response to the access device 104 using the session keys whereupon the access device decrypts the response using derived session keys to validate the encrypted response.

In some embodiments in a partial online mode, in response to determining an offline mode (for the mobile device 106), the mobile device 106 submits the authentication token as an encrypted message to the access device 104 further using derived session keys at the mobile device 106 and whereupon the access device 104 forwards the encrypted message to an authentication server 108 serving as the authentication authority, the authentication server 108 decrypts the encrypted message and validates the response if a determination is made that the reference image selected matches the reference image displayed at the access device.

In some embodiments, the mobile device 106 submits the authentication token as the encrypted message to the access device 104 using a wireless or wired communication protocol requiring close proximity selected among Bluetooth, Bluetooth Low Energy, Near Field Communication, or USB (Universal Serial Bus) in an offline mode or a partial offline mode (see FIGS. 2, 3, 6, and 7).

In some embodiments, a system 100 of image-based login authentication of a user 102 on an access device 104 separately using a mobile device 106 registered to the user and having an authentication application providing a plurality of image references and enabling a selection of an image reference 402 among the plurality of image references (402,452) where the system includes one or more processors operatively coupled to memory having computer instructions which when executed by the one or more processors causes the one or more processors to perform certain functions. In some embodiments, the functions perform (outlined in FIGS. 1 and/or 5) receiving login information at the access device 104, displaying the image reference at the access device 104, the image reference being one among a plurality of image references provisioned at the mobile device 106 and identified for user selection by an authentication server 108, displaying the image reference selected by the authentication server 108 for matching at the mobile device 106 displayed along with other image references among the plurality of image references provisioned at the mobile device, receiving an authentication token at the authentication server 108 from the mobile device 106 corresponding to a user selection at the mobile device of one of the plurality of image references provisioned at the mobile device, receiving validation by the access device 104 of a completed authentication if the authentication server 108 validates the authentication token when the user selection matches the image reference displayed at the access device 104, and allowing login at the access device 104 if the authentication token is validated.

In some embodiments, the system further encrypts the authentication token to provide an encrypted authentication token, and in response to receiving the encrypted authentication token, the authentication server 108 derives session keys to decrypt the encrypted authentication token before validating the authentication token and sending confirmation of such validation to the access device 104.

In the absence of any specific clarification related to its express use in a particular context, where the terms "substantial" or "about" or "usually" in any grammatical form are used as modifiers in the present disclosure and any appended claims (e.g., to modify a structure, a dimension, a measurement, or some other characteristic), it is understood that the characteristic may vary by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device or processor may be transformed from a generic and unspecific computing device or processor to a combination device comprising hardware and software configured for a specific and particular purpose providing more than conventional functions and solving a particular technical problem with a particular technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments. The various embodiments described above can be combined to provide further embodiments. Aspects of the embodiments can be modified, if necessary to employ concepts of the various patents, application and publications to provide further embodiments.

The invention claimed is:

1. A method of image-based login authentication of a user on an access device using a mobile device registered to the user, comprising:
   receiving login information at the access device;
   determining an online mode, an offline mode and a partial offline mode, whereby
      for the online mode, Internet access exists to an authentication server for both the mobile device and the access device, and no Internet access exists between the mobile device and the access device;
      for the offline mode, no Internet access exists to the authentication server for both the mobile device and the access device, but Internet access exists between the mobile device and the access device;
      for the partial offline mode, no Internet access exists to the authentication server for the mobile device, but Internet access exists to the authentication server via the access device, and Internet access exists between the mobile device and the access device;
   selecting a mode for the access device from the group consisting of the online mode, the offline mode, and the partial offline mode;
   displaying an image reference at the access device, the image reference being one among a plurality of image references provisioned at the mobile device and an authentication authority;
   displaying the image reference selected by the authentication authority for matching at the mobile device along with other image references among the plurality of image references provisioned at the mobile device;
   extracting, by the mobile device, an embedded dataset the embedded dataset comprising at least a challenge and transaction identifier from within the image reference at the mobile device, the image reference corresponding to a selection at the mobile device of one of the plurality of image references provisioned;
   performing a cryptogram calculation at the mobile device using as input the embedded data set;
   receiving according to the mode an authentication token corresponding to the selection and the cryptogram calculation, whereby
      for the online mode, the mobile device submits said authentication token to the authentication server, and the access device then checks that the authentication server validated the authentication token;
      for the offline mode, the mobile device submits said authentication token to the access device instead of the authentication server, and the access device validates the authentication token;
      for the partial offline mode, the mobile device submits said authentication token to the access device instead of the authentication server, the access device then submits said authentication token to the authentication server, and the access device then checks that the authentication server validated the authentication token;
   receiving further validation by the access device of a completed authentication that the selection matches the image reference displayed at the access device; and
   allowing login at the access device if the authentication token is validated and said further validation was received.

2. The method of claim 1, wherein the mobile device uses an authentication application to provision the plurality of image references on the mobile device, display at least a portion of the plurality of image references including the image reference, and enable a selection of the image reference among the plurality of image references.

3. The method of claim 1, wherein the mobile device submits the authentication token that includes data from the image reference to the authentication authority.

4. The method of claim 1, wherein the mobile device submits the authentication token that includes encrypted session keys to the authentication authority.

5. The method of claim 1, wherein the mobile device submits the authentication token including encrypted session keys to an authentication server serving as the authentication authority.

6. The method of claim 5, wherein the access device receives confirmation of validation of the authentication token validated by the authentication server.

7. The method of claim 1, wherein for said offline mode and said partial offline mode:
   the mobile device submits the authentication token to the access device serving as the authentication authority, the access device checks the validity of the authentication token to grant access to the access device.

8. The method of claim 1, wherein the mobile device submits the authentication token including encrypted session keys to the authentication authority and wherein the authentication authority decrypts the session keys and validates the authentication token if the selection matches the image reference displayed at the access device.

9. The method of claim 1, wherein in response to determining the offline mode and the partial offline mode the access device forwards the encrypted message to the authentication server serving as the authentication authority, the authentication server decrypts the encrypted message and validates the response if a determination is made that the reference image selected matches the reference image displayed at the access device and data transmitted from said embedded dataset via the graphical display are matching.

10. The method of claim 1, wherein the method rejects authentication if the authentication token is not validated by the authentication authority.

11. The method of claim 1, wherein an authentication application executing on the mobile device displays at least two among the plurality of image references including the image reference provisioned at the mobile device for selection by a user of the mobile device and wherein the authentication authority is either a remote authentication server or the access device itself and wherein the validation is completed by checking with the remote authentication server when the access device or the mobile device has communication access to the remote authentication server and by checking with the access device itself when neither the access device nor mobile device has access to the remote authentication server.

12. A system of image-based login authentication of a user on an access device using a mobile device registered to the user, comprising:
   one or more processors and memory operatively coupled together, with the memory having computer instructions which when executed by the one or more processors causes the one or more processors to perform the functions of:
      receiving login information at the access device;
      determining an online mode, an offline mode and a partial offline mode, whereby
         for the online mode, Internet access exists to an authentication server for both the mobile device and the access device, and no Internet access exists between the mobile device and the access device;
         for the offline mode, no Internet access exists to the authentication server for both the mobile device and the access device, but Internet access exists between the mobile device and the access device;
         for the partial offline mode, no Internet access exists to the authentication server for the mobile device, but Internet access exists to the authentication server via the access device, and Internet access exists between the mobile device and the access device;
      selecting a mode for the access device from the group consisting of the online mode, the offline mode, and the partial offline mode;
      displaying an image reference at the access device, the image reference being one among a plurality of image references provisioned at the mobile device and provisioned at an authentication authority and generated by the authentication authority for selection;
      arranging for the display of the image reference selected by the authentication authority at the mobile device along with other image references among the plurality of image references for selection at the mobile device;
      extracting, by the mobile device, an embedded dataset—the embedded dataset comprising at least a challenge and transaction identifier—from within the image reference at the mobile device, the image reference corresponding to a selection at the mobile device of one of the plurality of image references provisioned;
      performing a cryptogram calculation at the mobile device using as input the embedded data set;
      receiving according to the mode an authentication token corresponding to the selection and the cryptogram calculation, whereby
         for the online mode, the mobile device submits said authentication token to the authentication server, and the access device then checks that the authentication server validated the authentication token;
         for the offline mode, the mobile device submits said authentication token to the access device instead of the authentication server, and the access device validates the authentication token;
         for the partial offline mode, the mobile device submits said authentication token to the access device instead of the authentication server, the access device then submits said authentication token to the authentication server, and the access device then checks that the authentication server validated the authentication token;
      receiving further validation by the access device of a completed authentication that the selection matches the image reference displayed at the access device; and
      allowing login at the access device if the authentication token is validated and said further validation was received.

13. The system of claim 12, wherein the mobile device submits the authentication token including encrypted session keys to an authentication server serving as the authentication authority and wherein the authentication server decrypts the session keys and validates the authentication token if the selection matches the image reference displayed at the access device.

14. The system of claim 12, wherein for said offline mode and said partial offline mode:
   the mobile device submits the authentication token including session encryption keys to the access device serving as the authentication authority and wherein
   the access device itself decrypts the session keys and validates the authentication token if the selection matches the image reference displayed at the access device.

15. The system of claim 12, wherein in response to determining the offline mode the access device forwards the encrypted message to the authentication server serving as the authentication authority, the authentication server decrypts the encrypted message and validates the response if a determination is made that the reference image selected matches the reference image displayed at the access device and data transmitted from said embedded dataset via the graphical display are matching.

* * * * *